United States Patent [19]

Hager, Jr.

[11] 4,117,712
[45] Oct. 3, 1978

[54] EMISSIMETER AND METHOD OF MEASURING EMISSIVITY

[75] Inventor: Nathaniel E. Hager, Jr., Lancaster, Pa.

[73] Assignee: Armstrong Cork Company, Lancaster, Pa.

[21] Appl. No.: 651,762

[22] Filed: Jan. 23, 1976

[51] Int. Cl.² .............................................. G01N 25/00
[52] U.S. Cl. .................................. 73/15 A; 73/355 R
[58] Field of Search ......... 73/355 R, 355 EM, 190 H, 73/15 R, 15 A

[56] References Cited

U.S. PATENT DOCUMENTS

| | | | |
|---|---|---|---|
| 3,045,473 | 7/1962 | Hager, Jr. | 73/15 A |
| 3,069,983 | 12/1962 | Kerstetter | 73/355 EM X |
| 3,277,715 | 10/1966 | Vanderschmidt | 73/355 |
| 3,529,473 | 9/1970 | Hager, Jr. | 73/355 R |
| 3,796,099 | 3/1974 | Shimotsuma et al. | 73/355 EM |

OTHER PUBLICATIONS

Hager, Jr., N. E.; "Method . . . Apparatus", 7th Conference on Thermal Conductivity, NBS Spec. Pub. No. 302, 1968; pp. 241-246.
Shulte, E. H.; "Pulsed . . . Conductivity"; 9th Conference on Thermal Conductivity; 1969; pp. 589-598.

Primary Examiner—Donald O. Woodiel
Attorney, Agent, or Firm—Pollock, Vande Sande & Priddy

[57] ABSTRACT

A method and apparatus for ready measurement of total hemispherical emissivity of a surface under ambient conditions, in situ. The apparatus, which may be readily made portable, comprises a heat sink to which is laminated a metal foil heater enclosed in a thermal insulating film. A black coating of known emissivity is applied to the exposed surface of the film and a fast-responding heat flux sensor is attached thereto. This apparatus is spaced a predetermined distance from a test surface and the enclosed air space is surrounded by a reflective skirt. A power source, such as a battery, powers the heater with a fixed current, and a suitable voltmeter is driven by the heat sensor. The method of measurement comprises equalizing the temperature of heat sink and test surface, energizing the heater and noting the steady state value of the voltage provided by the heat sensor. By employing a predetermined calibration curve, derived with the fixed heater current and various surfaces of known emissivity, the emissivity of the test surface can be read off the curve corresponding to output voltage of the heat sensor.

14 Claims, 5 Drawing Figures

EMISSIMETER AND METHOD OF MEASURING EMISSIVITY

FIELD OF THE INVENTION

The invention relates to a method and apparatus for ready measurement of total hemispherical emissivity of a surface under ambient conditions, in situ.

BACKGROUND OF THE INVENTION

The emissivity of a surface is a measure of its ability to exchange radiant heat with the surrounding. The emissivity of surfaces is an important characteristic both in the laboratory as well as in practical architectural and industrial situations. For instance, because the emissivity of a surface depends critically on the physical and chemical structure, emissivity measurement is an important method for detecting impurities, gauging degree of cleanliness, or otherwise characterizing the surface.

The prior art evidences apparatus for, and methods of, measuring the emissivity of various materials. A common drawback of the prior art is that it usually requires complex equipment, generally only usable under laboratory conditions and the measurement takes a substantial amount of time. In this regard see Vanderschmidt, U.S. Pat. No. 3,277,715 and "Method for Measuring Total Hemispheric Emissivity of Plain Surfaces with Conventional Thermal Conductivity Apparatus" by N. E. Hager, Jr., appearing in the proceedings of the Seventh Conference on Thermal Conductivity, NBS Special Publication 302, U.S. Government Printing Office, 1968, pages 241–246.

Both of the references mentioned above illustrate methods of, and apparatus for, total hemispheric emissivity measurements. However, each requires thermal equilibrium for its measurement as well as knowledge of the temperature of the surface whose emissivity is to be measured. I have found that typically it takes 6–8 hours for thermal equilibrium to be reached and the temperature measurements require equipment which cannot readily be made portable.

Vanderschmidt, specifically, requires the temperature of the unknown surface be known and furthermore requires the use of a thermal electric cooler having water or other coolant circulating therein. It is not apparent an apparatus of this sort can be made portable and/or relatively simple.

In view of the foregoing, it is one object of the present invention to provide an apparatus for, and method of, making total hemispherical emissivity measurements with relatively simple apparatus which may easily be made portable. It is another object of the present invention to provide the foregoing which can accomplish the measurement in a short period of time. It is a further object of the invention, which is capable of the foregoing advantages, and which is further capable of performing measurements under ambient conditions. Still another object of the present invention is to provide an apparatus of, and method, meeting the preceding conditions, which can be applied to test surfaces in situ. The present invention meets these and other objects as is more fully explained below.

SUMMARY OF THE INVENTION

These and other objects of the invention are met by providing an emissimeter having a heat sink with a first means covering an exposed surface of the sink. The first means includes heating means in a thermal insulating film, and further includes a heat flux sensor with the exposed surface of the first means being provided with the surface of a known emissivity. A second means is provided for supporting this sink a predetermined distance from the surface whose emissivity is to be measured, with the first means opposite thereto. A switchable power supply is connected to the heating means for energizing the heating means with a predetermined current and a voltage transducing means is connected to the heat flux sensor. The heat flux sensor provides a voltage related to the heat flow. The novel method of measuring total hemispheric emissivity includes providing a heat sink having a heater and heat sensor, with an exposed surface of known emissivity; equalizing the temperature of the sink and the surface whose emissivity is to be measured, for instance by placing the two in contacting relationship; spacing the sink from the surface, when the temperatures have been equalized, by a predetermined distance with the exposed surface of the sink opposite the surface to be measured; energizing the heater with a predetermined current; and, monitoring the heat sensor output at a steady-state value.

When the heater is energized, starting from a condition which both the heat sink and surface to be measured have equal temperatures, the temperature of the exposed surface of the first means rises rapidly. The relatively large mass of the heat sink, however, does not quickly change in temperature. As a result, the heat flux sensor detects a relatively large amount of heat flow which then settles down in a matter of seconds, to an equilibrium value. By previously calibrating the emissimeter, the emissivity of the test surface can be read off the calibration curve at the coordinate related to the steady-state output of the heat flux sensor.

The prior art makes it clear that the emissivity of a surface can be determined from the rate at which it exchanges heat with another nearby parallel surface of known emissivity, provided temperatures of both surfaces and spacing therebetween are known. A surface of known emissivity is simply provided by coating the surface of an object with a coating whose emissivity is known. Spacing between the surface of known emissivity and the surface of the object whose emissivity is to be measured is provided by a frame for supporting one surface with respect to the other. The rate of heat exchange is determined by employing a heat flux sensor such as that shown in U.S. Pat. No. 3,427,209. The only remaining goal is to provide a suitable temperature difference between these surfaces. In view of one of the objects of the invention, e.g., providing a portable instrument, measuring the temperature difference in this context can be a difficult problem. The invention avoids this problem by simply not attempting to measure the temperature difference, but instead providing conditions to repetitively provide the same temperature difference. Under these conditions the instrument can be calibrated by using, instead of an object whose emissivity is to be tested, a second object of known emissivity. In this fashion, the output of the heat flux sensor can be correlated with the emissivities of the second object, with a fixed current in the heater. Once such a calibration curve is obtained, one can measure the emissivity of an unknown surface by simply reading the output of the heat flux sensor, so long as the measurement takes place under similar circumstances, e.g., the heater is energized with the same fixed current.

BRIEF DESCRIPTION OF THE DRAWINGS

The present invention will be described in conjunction with the attached drawings, in which like reference characters identify identical apparatus and in which.

DETAILED DESCRIPTION OF PREFERRED EMBODIMENT

Figure 1:
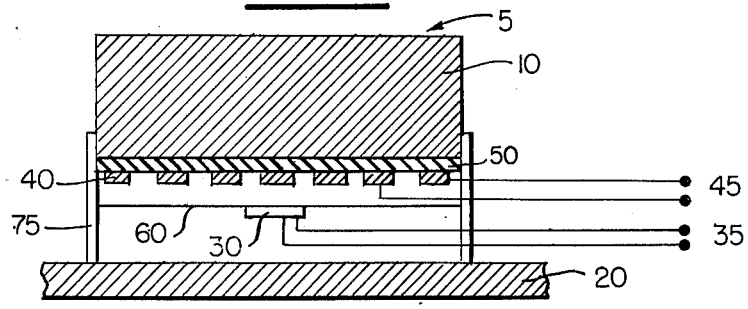
FIG. 1 is a cross-section of the novel emissimeter shown in measuring relationship to a test surface.

FIG. 1 shows the emissimeter 5, in cross-section in its measuring position, with respect to an object 20, whose emissivity is to be measured. Particularly, a thin-foil electric heating element 40 is laminated to one surface of a thin sheet of thermal insulating material 50, the other surface of this insulating material 50 is adhesively bonded to a heavy block of high-thermal conductivity metal forming a heat sink 10. A film 60 encloses the electric heating element 40, with the exposed surface of the film having been treated with a coating of known emissivity. The heat flux sensor 30, such as that shown in U.S. Pat. No. 3,427,209, is bonded with a suitable adhesive, such as Dow Corning No. 281 pressure-sensitive silicone, to the film 60. A reflective skirt 75 encloses the space between the heat sink 10 and the object whose emissivity is to be measured 20. Leads 45 are brought out of the emissimeter 5 for connection to a suitable switchable power source for the heating element 40. Likewise, output terminals 35 of the heat flux sensor 30 are brought out of the emissimeter 5 for connection to a suitable voltage transducing device. Heater 40, surface of know emissivity 60, and heat flux sensor 30, are spaced a predetermined distance from the surface of the object whose emissivity is to be measured 20, by a suitable frame 70 which also supports the reflective skirt. The frame can be fabricated in a variety of ways, for instance, it can comprise a plurality of rods threaded at one end which are coupled to the sink 10 by drilling and tapping holes therein.

Figure 2:
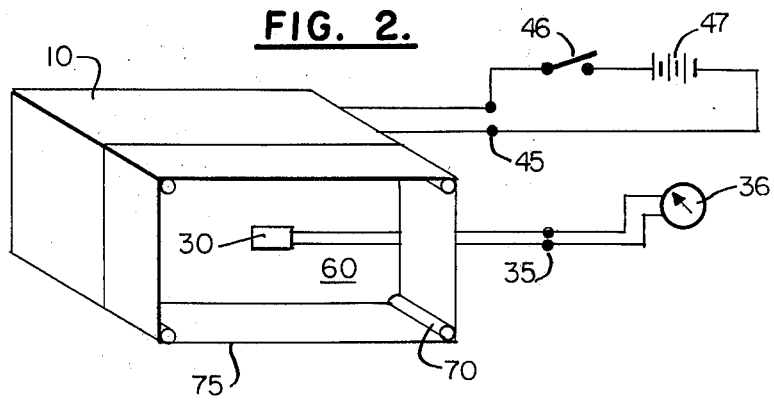
FIG. 2 is a three-dimensional view of the novel emissimeter.

FIG. 2 shows a three-dimensional view of the emissimeter 5, as viewed from the bottom showing the surface of known emissivity 60 on which the heat flux sensor 30 is mounted. Also shown in FIG. 2 is the connection between the heat flux sensor 30 and the voltage transducer 36. As is also illustrated in FIG. 2, a suitable power source, which is illustrated as a battery 47, is connected through a switch to the terminals 45 of the thin film heater. Although battery 47 is illustrated, those skilled in the art will understand that other power supplies can be employed, and either a direct or alternating current can be used. Preferably, the power supply is such that the current through the heating elements 40 is fixed.

In operation, the temperature of the test object 20 is equalized with the temperature of sink 10. A simple method of effecting this is to bring the test object 20 into contact with the heat sink 10 for sufficient time to equalize the temperatures. This can be checked by placing the emissimeter 5 on the test object 20 in the measuring position and monitoring the output of the heat flux sensor 30. When that output is zero then there is substantially no temperature difference between the emissimeter 5 and the object 20. Alternatively, the emissimeter 5 or the test object 20 can be heated or cooled so as to speed up this equalization process.

When the temperatures of the emissimeter 5 and object 20 have been equalized, the switch 46 is closed so as to pass a fixed current in the heater. The temperature of the heater and associated surface 60 quickly levels off at a temperature elevated above that of the heat sink 10 by an amount consistent with the magnitude of the fixed current flowing in the heater. Since the heat sink 10 and test object 20 were at a common temperature prior to energizing the heater, the elevated temperature of the surface 60 of known emissivity exceeds that of the test object by the same amount that it exceeds that of the heat sink 10. Thus, although the temperature of the surface 60 and the test object 20 are not known quantitatively, this temperature variation can be consistently achieved. Thus one can, prior to making an actual measurement, calibrate the emissimeter by employing, instead of a test object 20, objects having known emissivity.

Figure 3:
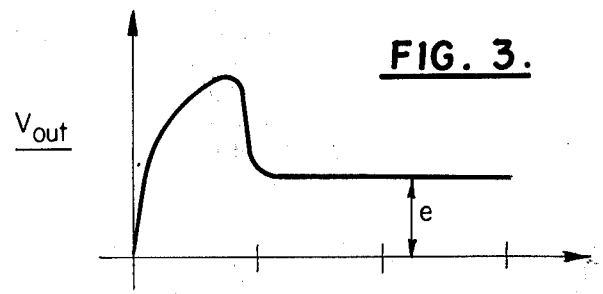
FIG. 3 is a voltage vs. time plot of a typical output of the emissimeter.

Under these conditions the output of the heat flux sensor 30, transduced by the voltage transducer 36 will take the form illustrated in FIG. 3. Thus, typically the output rapidly increases and then falls somewhat to level off at a steady-state value. It is the steady-state value which is consistent with the emissivity of the object 20. By employing a plurality of standard objects, having different emissivities, a calibration curve, such as that shown in FIG. 4, may be created. It should be emphasized, however, that in each of the tests which go up to make the calibration curve the heater current should be fixed, and the same heating current should be employed when testing objects having unknown emissivities. Once the calibration curve is obtained, a similar procedure may be employed when using objects having unknown emissivity. The steady-state output of the voltage transducer 36 will, employing the calibration curve of FIG. 4, allow one to readily determine the emissivity of the object.

The spacing between the surface 60 and the surface of the object being tested 20 must be large enough to limit air-conducted heat so radiant heat transfer is given appropriate emphasis. The spacing, however, cannot be so large as to allow complicated convection currents to exist. Experience shows that the best compromise is on the order of 0.25 to 0.50 inches. The thermal insulation between the heater elements 40 and the heat sink 10, i.e., insulation 50, must be thick enough to limit the heat loss to the block so that the temperature of the block and the surface 60 does not change significantly during the measurement. The same thermal insulation should also be thick enough so the required temperature difference between the heated surface 60 and the temperature of the test object 20 can be obtained with a modest amount of electrical power, especially if the device is intended to be a battery-powered portable device. On the other hand, this insulation must also be thin enough so the surface 60 quickly settles to its elevated temperature before the heat sink 10 temperature changes. I have found that a thermal insulation such as cork composition, having a thickness between about 1/32 and ⅛ inches gave best results. The ratio of thermal conductivity k, of the thermal insulation to its thickness, should fall between about 2 and 10 Btu/hr-ft$^2$·F for best operation. When this ratio is less than 2 the operation is too slow and when the ratio exceeds 10 the heat sink 10 heats too rapidly.

In order to minimize edge effects the larger dimensions of the heat sink 10 should be about an order of magnitude greater than the spacing of about 0.5 inches. Thus, I prefer to have a heat sink 10 whose dimensions are at least 4 × 4 inches. The heat sink 10 should be made of a metal of high thermal conductivity and high specific heat. The product of density and thickness of the sink 10 should be as high as consistent with ready portability, i.e., the device obtains particular advantages if the operator is able to hold it against the test surface for a few minutes without excessive fatigue. I therefore prefer a two-inch thick block of aluminum.

The heat flux sensor 30 can be that shown in U.S. Pat. No. 3,427,209 or a sensor having similar characteristics. It should be thin enough so that it offers negligible resistance to heat flow and does not perturb the radiant heat flow field between the heated and test surfaces. It should have a sensitivity and response time adequate to produce a signal to drive the voltage transducer 36 before the temperature of heat sink block 10 changes significantly.

SPECIFIC EXAMPLE

One example of the emissimeter of this invention which has been built includes a heat sink 10 comprising an aluminum block 4 × 4 × 2 inches. The insulating layer 50 is a cork composition of thickness 0.052 inches with a density of 10 lb/ft$^3$ and thermal conductivity about 0.33 Btu-in/hr·ft$^2$-°F. With these parameters the ratio of thermal conductivity to thickness is about 6.3. The heater is made of 0.001 inches thick number 321 stainless steel foil, cut into a serpentine configuration of 0.5 inches wide ribbons with a 1/16 inch spacing between adjacent courses of the ribbon. The total resistance of the heater was 1.25 ohms. The sensitivity of the heat flux sensor was 0.0538 microvolts-ft$^2$-hr/Btu. Support rods, such as rods 70 in FIG. 2, were provided to determine the spacing between the heat of surface 60 and the test surface; these rods were 9/16 inches long. Since the rod length beyond the heater determines spacing the 9/16 inch rods result in about 0.5 inch spacing. The skirt 75, which was fastened around the periphery of the block on the support rods to exclude drafts, comprised reflective aluminum foil. In order to give the surface 60 an emissivity of known value it was coated with a flat black paint (Broma Alkayd Enamel modern flat black number 110, manufactured by Master Bronze Powder Company, Inc., Calumet, Ill.). The emissivity of this surface is 0.925 as specified in the Hager report, cited above.

In operation, a power supply is chosen, which may be a DC battery, so long as its capability is sufficient to give a relatively constant current level into the heater. A suitable voltage transducer 36 is selected, such as A. B. Keithley microvoltmeter model 150B. With the heating supply open-circuited the heat sink 10 and test surface are brought to the same temperature. This can be effected by positioning the emissimeter 5 in the measuring position and waiting until the heat flux sensor 30 output reads zero. The temperature equalization can be speeded up by placing an available surface of the heat sink 10 against the surface of the test object for a few minutes, or one or the other of these objects can be either heated or cooled as desired. With the temperatures of the heat sink 10 and test object equalized, the emissimeter is put into measuring position as shown in FIG. 1 and a zero output should be obtained confirming temperature equalization. The heater supply is then closed. The output of the transducer 36 is then read as a function of time until the voltage stabilizes as shown in FIG. 3. This takes about 60 seconds.

Figure 4:
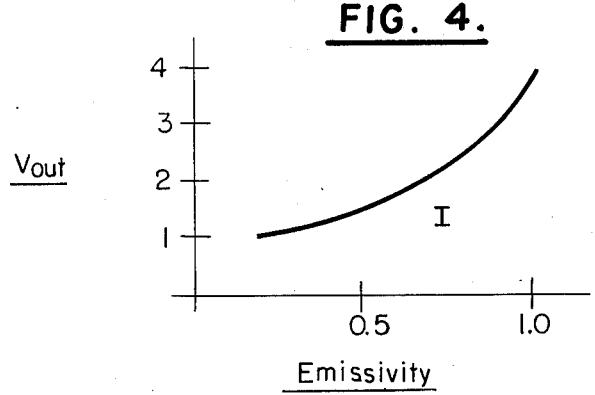
FIG. 4 is a voltage vs. emissivity plot illustrating a typical calibration curve for the emissimeter.

In order to convert the voltage transducer output into emissivity, a calibration curve such as that shown in FIG. 4, is necessary. To produce such a calibration curve, a procedure similar to the foregoing is carried out, with the same heater current, for a number of different objects whose emissivity is known. The steady-state output voltage is plotted as a function of the emissivity to obtain the curve similar to FIG. 4. With the calibration curve of FIG. 4 and the steady-state output of the transducer 36 corresponding to an unknown emissivity, one can simply read the emissivity of the unknown or test object off the calibration curve at the location corresponding to the steady-state output of the transducer 36.

The foregoing operation works well for surfaces of high thermal conductivity such as metals and heavy non-metals such as concrete, stone or ceramics. Likewise, the procedure outlined above is adequate for measuring samples which are coatings or sheets laminated to such high thermal conductivity materials as is mentioned above.

However, with low-conductivity materials or coatings or sheets laminated thereon the surface temperatue of the unknown rises to meet that of the emissimeter during the run and a steady signal may never be obtained which is suitable for interpretation with the standard calibration curve. To overcome this problem, the transducer output is plotted as a function of time. After plotting, the curve is extrapolated to zero time, to get the appropriate value of transducer output to be used when referring to the calibration chart.

Figure 5:
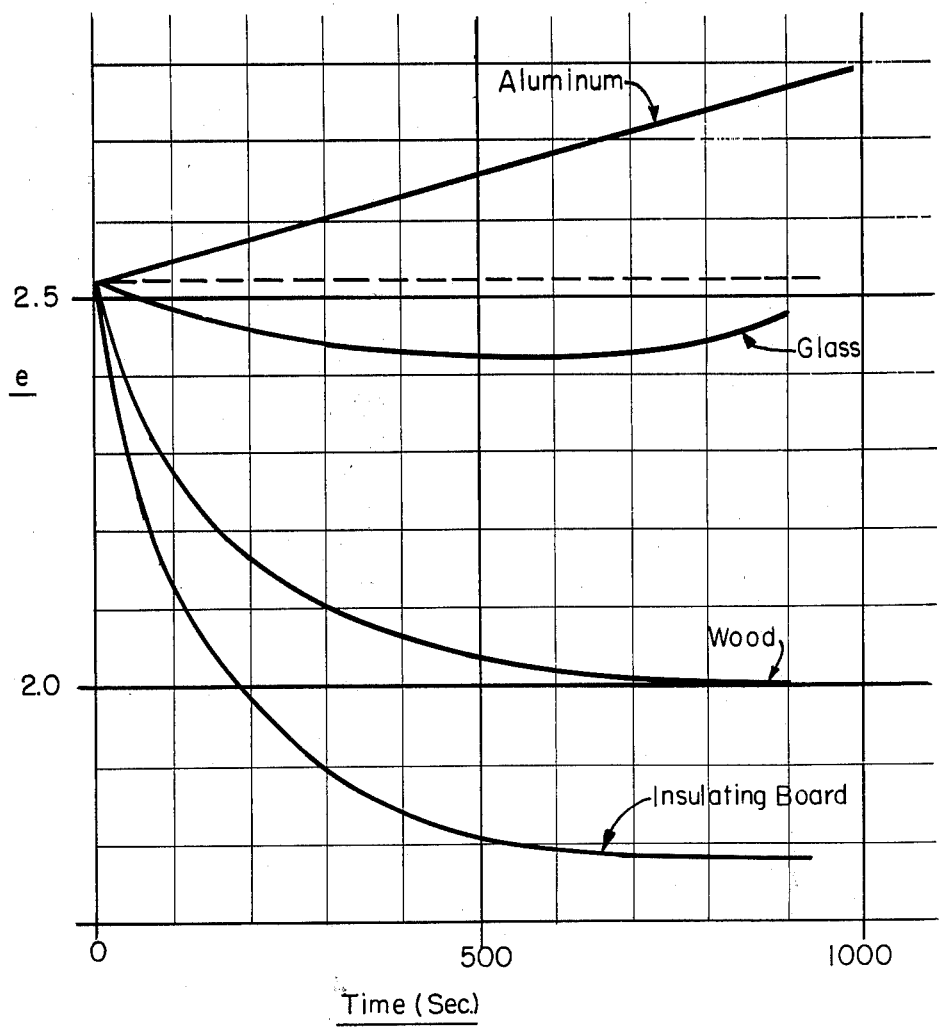
FIG. 5 is a typical plot of measurement output versus time illustrating the derivation of emissivity in those cases where the output does not reach a steady state value.

As an example, FIG. 5 is a voltage vs. time plot, showing the transducer output as a function of time for test objects which consist of paper on a variety of substrates such as aluminum, glass, wood and insulating board. As is illustrated in FIG. 5, extrapolating the curves back to zero time indicates that the common transducer output would be 2.5 microvolts. With this information, then, one can go to the calibration curve, such as that shown in FIG. 4 and obtain an emissivity value for the paper.

From the foregoing, it should be clear that the inventive method and apparatus allow ready measurement of total hemispheric emissivity on objects, in situ, and under ambient conditions. That is, tests can be effected on objects or surfaces in the condition and location where they exist and at their normal temperatures, i.e., heating or cooling of the object under test is not necessary.

I claim:

1. A method of measuring total hemispherical emissivity of a surface without prior knowledge of the surface's temperature without requiring maintenance of a known temperature difference during measurement and comprising the steps of:
    (a) providing a heat sink, having a heater and a heat flux sensor with an exposed surface of known emissivity;
    (b) equalizing the temperature of said heat sink and of said surface whose emissivity is to be measured;

(c) spacing said sink from said surface by a predetermined distance with said sink surface of known emissivity opposite said surface to be measured;

(d) energizing said heater with a predetermined current; and, (e) monitoring said heat sensor output at its steady-state value.

2. The method of claim 1 in which said step (b) includes placing said sink and said surface into contacting relationship.

3. The method of claim 1 which further includes the step subsequent to said step (c) and prior to said step (d) of enclosing the volume between said sink and said surface with a reflective skirt.

4. The method of claim 1 which includes the further steps, prior to said step (b) of determining a calibration curve including the steps of:

(i) equalizing the temperature of said sink and of a surface whose emissivity is known;

(ii) spacing said sink from said known emissivity surface by a predetermined distance with said sink surface of known emissivity opposite said surface of known emissivity;

(iii) energizing said heater with said predetermined current;

(iv) monitoring said heat sensor output and its steady-state value, and performing the steps (i-iv) with other objects whose emissivity is known and different from said object of known emissivity;

(v) plotting said steady-state heat sensor output as a function of said known emissivities.

5. Apparatus for measuring total hemispherical emissivity of an unknown surface, in situ, without requiring maintenance of a known temperature difference during measurement or prior knowledge of the temperature of said surface comprising:

a heat sink having an exposed surface;

first means covering said exposed surface with heating means in a thermal insulating film and including a heat flux sensor, said first means having a known emissivity of an exposed surface threof;

second means for supporting said sink with the exposed surface of said first means, at a predetermined distance from said surface;

a switchable power supply connected to said heating means for said energizing said heating means with a predetermined current; and a voltage transducing means connected to said heat flux sensor.

6. The apparatus of claim 5 which further includes a reflective skirt attached to said second means for enclosing a volume lying between said unknown surface and said exposed surface of said first means.

7. The apparatus of claim 5 wherein said heat sink comprises a metal block of high thermal conductivity.

8. The apparatus of claim 5 in which said heat sink comprises an aluminum block.

9. The apparatus of claim 5 in which said thermal insulating film comprises a cork composition having a ratio of thermal conductivity to thickness in a range of 2-10.

10. The apparatus of claim 5 wherein said thermal insulating film comprises a cork composition having a ratio of thermal conductivity to thickness of approximately 6.3.

11. The apparatus of claim 5 wherein said heating means comprising a thin foil serpentine pattern metal conductor laminated to said thermal insulating film.

12. The apparatus of claim 5 wherein said first means is coated with a composition providing a known emissivity.

13. The apparatus of claim 5 wherein said predetermined distance is in the range of 0.25 – 0.50 inches.

14. The apparatus of claim 13 wherein said heat sink has major dimensions approximately ten times said predetermined distance.

* * * * *

UNITED STATES PATENT OFFICE
CERTIFICATE OF CORRECTION

PATENT NO. : 4,117,712

DATED : October 3, 1978

INVENTOR(S) : Nathaniel E. Hager, Jr.

It is certified that error appears in the above-identified patent and that said Letters Patent are hereby corrected as shown below:

Column 3, line 13, after ";" insert --and--.

Column 6, line 61, after the word "temperature" insert --and--; line 62, delete the word "and".

Column 8, line 4 and 5, "predetermined distance from said surface;" should read --predetermined distance from said unknown surface with said first means opposite said unknown surface;--.

Signed and Sealed this

Twentieth Day of February 1979

[SEAL]

Attest:

RUTH C. MASON
Attesting Officer

DONALD W. BANNER
Commissioner of Patents and Trademarks